United States Patent
Farmer (10) Patent No.: US 7,640,794 B2
(45) Date of Patent: Jan. 5, 2010

(54) AIRFLOW BALANCE FOR A TWIN TURBOCHARGED ENGINE SYSTEM

(75) Inventor: David George Farmer, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 81 days.

(21) Appl. No.: 11/851,113

(22) Filed: Sep. 6, 2007

(65) Prior Publication Data

US 2009/0064677 A1  Mar. 12, 2009

(51) Int. Cl.
*G01M 19/00* (2006.01)
(52) U.S. Cl. ............... 73/114.39; 73/114.13; 73/114.35
(58) Field of Classification Search ............... 73/114.13, 73/114.31, 114.32, 114.35, 114.71; 60/602, 60/612; 123/562, 564
See application file for complete search history.

(56) References Cited

U.S. PATENT DOCUMENTS

| | | | |
|---|---|---|---|
| 4,781,027 A | 11/1988 | Richter et al. | |
| 5,090,204 A | 2/1992 | Bonitz et al. | |
| 5,845,495 A | 12/1998 | Schray et al. | |
| 6,050,250 A | 4/2000 | Kerkau | |
| 6,202,414 B1 | 3/2001 | Schmidt et al. | |
| 6,253,551 B1 * | 7/2001 | Lohmann et al. | 60/602 |
| 6,338,250 B1 | 1/2002 | Mackay | |
| 6,637,205 B1 * | 10/2003 | Ahmad et al. | 60/608 |
| 6,729,134 B2 * | 5/2004 | Arnold et al. | 60/602 |
| 6,945,239 B2 * | 9/2005 | Moser et al. | 123/568.2 |
| 6,968,689 B2 * | 11/2005 | Bleile et al. | 60/612 |
| 7,066,157 B2 * | 6/2006 | Takahashi et al. | 123/559.1 |
| 7,076,955 B2 * | 7/2006 | Herz et al. | 60/612 |
| 7,353,102 B2 * | 4/2008 | Narita et al. | 701/102 |
| 7,380,401 B2 * | 6/2008 | Henn et al. | 60/612 |
| 7,461,508 B2 * | 12/2008 | Rosin et al. | 60/612 |
| 2009/0013945 A1 * | 1/2009 | Buckland et al. | 123/90.15 |

* cited by examiner

*Primary Examiner*—Lisa M Caputo
*Assistant Examiner*—Freddie Kirkland, III
(74) *Attorney, Agent, or Firm*—Allan J. Lippa; Alleman Hall McCoy Russell & Tuttle LLP (57) ABSTRACT

As one example, a method of operating an engine system including a first air intake passage branch including a first compression device and a second air intake passage branch including a second compression device, wherein each of the first branch and the second branch are fluidly coupled to at least a combustion chamber the engine via a common intake passage, a first sensor arranged along the first branch and at least a second sensor arranged along the common intake passage, wherein the first sensor is a mass airflow sensor and wherein the second branch does not include a mass airflow sensor. The method comprises increasing the mass airflow through the first branch relative to the mass airflow through the second branch when an amount of decrease in the mass airflow through the first branch is more than half an amount of a corresponding decrease in the combined mass airflow.

20 Claims, 4 Drawing Sheets

AIRFLOW BALANCE FOR A TWIN TURBOCHARGED ENGINE SYSTEM

BACKGROUND AND SUMMARY

Some internal combustion engines utilize boosting devices such as turbochargers to increase the mass airflow through the engine, thereby enabling an increase of the work output of the engine. As one example, an engine may utilize twin turbochargers in separate parallel branches of the engine's air intake system to provide increased boost to the engine. One issue with twin turbocharged engines is that the amount of airflow provided by each of the turbochargers may become unbalanced. For example, degradation or failure of a turbocharger or other component of the exhaust system or variations in engine system components may cause one of the turbochargers to provide a larger portion of the total airflow to the engine than the other turbocharger. Thus, under these conditions, the engine system may generate noise and vibration harshness (NVH), experience reduced fuel efficiency, and/or the lower airflow turbocharger may experience compressor surge and may be damaged due to the imbalance of airflow provided by each turbocharger.

Some approaches aimed at addressing this issue have utilized a mass airflow sensor in each branch of the air intake system to reduce airflow imbalances resulting from imbalances in turbocharger operation. However, the inventors of the present application have identified some further issues with this approach. Specifically, the use of and reliance on separate mass airflow sensors in each air intake branch can add cost and complexity to the engine system. Further, failure or degradation of one of the mass airflow sensors can impair the ability to balance the airflow through each branch of the air intake passage.

As one example, the above issues may be addressed by a method of operating an engine system including a first air intake passage branch including a first compression device and a second air intake passage branch including a second compression device, wherein each of the first branch and the second branch are fluidly coupled to at least a combustion chamber the engine via a common intake passage, a first sensor arranged along the first branch and at least a second sensor arranged along the common intake passage, wherein the first sensor is a mass airflow sensor and wherein the second branch does not include a mass airflow sensor, the method, comprising increasing the mass airflow through the first branch relative to the mass airflow through the second branch when an amount of decrease in the mass airflow through the first branch is more than half an amount of a corresponding decrease in the combined mass airflow.

Thus, the combination of sensor outputs from a mass airflow sensor of only one of the two branches and an output from one or more sensors arranged in a combined flow region of the intake system can be used to identify imbalance between the two branches. In this way, an imbalance in mass airflow between two branches of an engine intake system, which may be caused, for example, by variations in compressor speed, can be reduced by the engine controller, while eliminating the need for a second mass airflow sensor in each branch of the air intake system.

DETAILED DESCRIPTION

Figure 1:
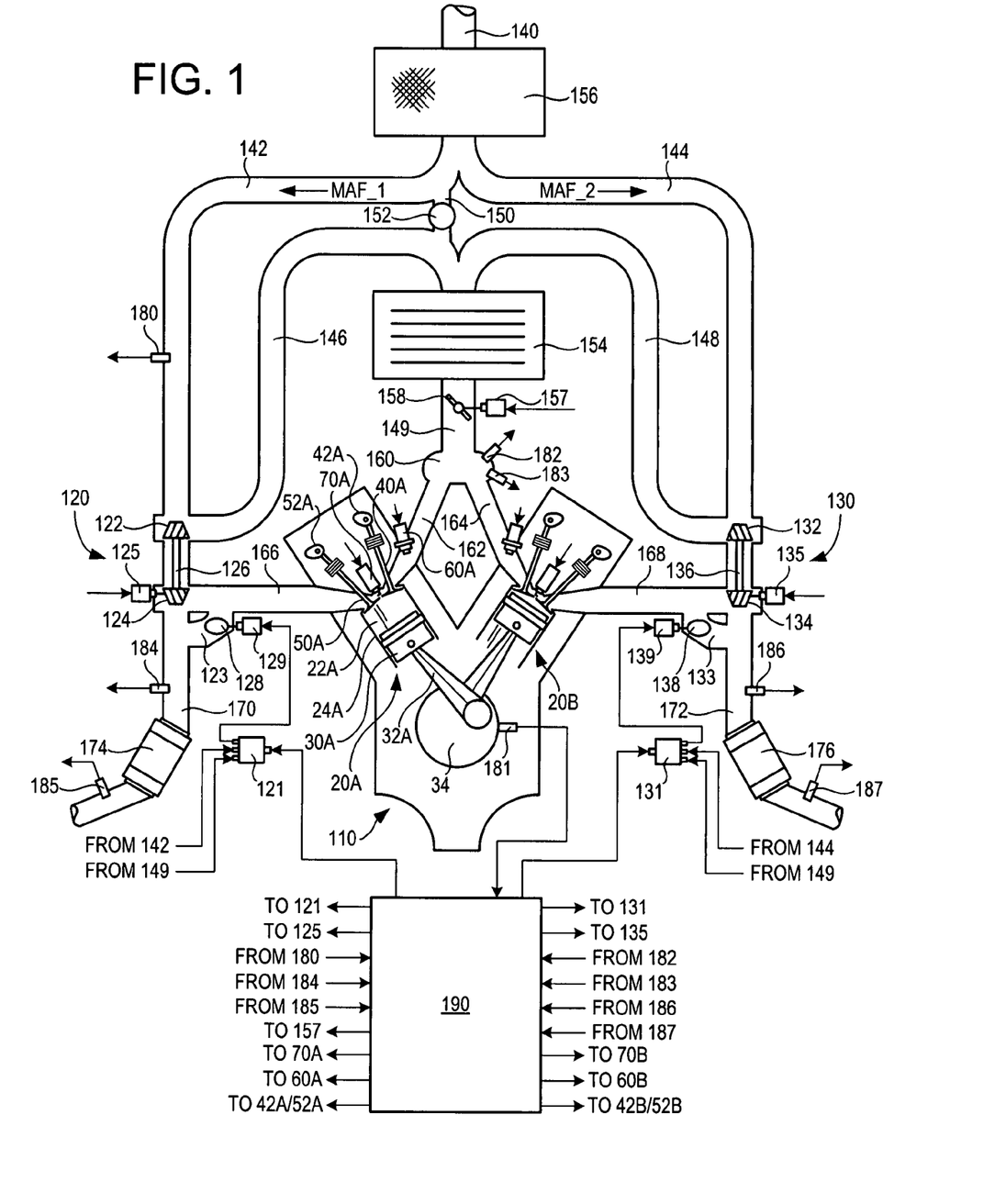
FIG. 1 shows a schematic depiction of an example engine system including twin turbochargers.

FIG. 1 shows a schematic depiction of an example engine system 100 including a multi-cylinder internal combustion engine 110 and twin turbochargers 120 and 130. As one non-limiting example, engine system 100 can be included as part of a propulsion system for a passenger vehicle. Engine system 100 can receive intake air via intake passage 140. Intake passage 140 can include an air filter 156. At least a portion of the intake air (MAF_1) can be directed to a compression device or compressor 122 of turbocharger 120 via a first branch of the intake passage 140 as indicated at 142 and at least a portion of the intake air (MAF_2) can be directed to a compressor 132 of turbocharger 130 via a second branch of the intake passage 140 as indicated at 144.

A first portion of the total intake air (MAF_1) can be compressed via compressor 122 where it may be supplied to intake manifold 160 via intake air passage 146. Thus, intake passages 142 and 146 form a first branch of the engine's air intake system. Similarly, a second portion of the total intake air (MAF_2) can be compressed via compressor 132 where it may be supplied to intake manifold 160 via intake air passage 148. Thus, intake passages 144 and 148 form a second branch of the engine's air intake system. As shown in FIG. 1, intake air from intake passages 146 and 148 can be recombined via a common intake passage 149 before reaching intake manifold 160. In some examples, intake manifold 160 may include an intake manifold pressure sensor 182 and/or an intake manifold temperature sensor 183, each communicating with control system 190. Intake passage 149 can include an air cooler 154 and/or a throttle 158. The position of the throttle can be adjusted by the control system via a throttle actuator 157 communicatively coupled to control system 190. As shown in FIG. 1, an anti-surge valve 152 may be provided to selectively bypass turbochargers 120 and 130 via bypass passage 150. As one example, anti-surge valve 152 can open to enable flow through bypass passage 150 where the intake air pressure of the combined air flow attains a threshold value.

Engine 110 may include a plurality of cylinders two of which are shown in FIG. 1 as 20A and 20B. Note that in some examples, engine 110 can include more than two cylinders such as 4, 5, 6, 8, 10 or more cylinders. Cylinders 20A and 20B may be identical in some examples and include identical components. As such, only cylinder 20A will be described in detail. Cylinder 20A includes a combustion chamber 22A defined by combustion chamber walls 24A. A piston 30A is disposed within combustion chamber 22A and is coupled to a crank shaft 34 via a crank arm 32A. Crank shaft 34 may include an engine speed sensor 181 that can identify the rotational speed of crank shaft 34. Engine speed sensor 181 can communicate with control system 190 to enable a determination of engine speed. Cylinder 20A can include a spark plug 70A for delivering an ignition spark to combustion chamber 22A. However, in some examples, spark plug 70A may be omitted, for example, where engine 110 is configured to provide combustion via compression ignition. Combustion chamber 22A may include a fuel injector 60A, which in this example is configured as a port based fuel injector. However, in some examples, fuel injector 60A can be configured as a direct in-cylinder injector.

Cylinder 20A can further include at least one intake valve 40A actuated via an intake valve actuator 42A and at least one exhaust valve 50A actuated via an exhaust valve actuator 52A. Cylinder 20A can include two or more intake valves and/or two or more exhaust valves along with associated valve actuators. In this particular example, actuators 42A and 52A are configured as cam actuators, however, in other examples, electromagnetic valve actuators may be utilized. Intake valve actuator 42A can be operated to open and close intake valve 40A to admit intake air into combustion chamber 22A via intake passage 162 communicating with intake manifold 160. Similarly, exhaust valve actuator 52A can be operated to open and close exhaust valve 50A to exhaust products of combustion from combustion chamber 22A into exhaust passage 166. In this way, intake air may be supplied to combustion chamber 22A via intake passage 162 and products of combustion may be exhausted from combustion chamber 22A via exhaust passage 166.

It should be appreciated that cylinder 20B or other cylinders of engine 110 can include the same or similar components of cylinder 20A as described above. Thus, intake air may be supplied to combustion chamber 22B via intake passage 164 and products of combustion may be exhausted from combustion chamber 22B via exhaust passage 168. Note that in some examples a first bank of cylinders of engine 110 including cylinder 22A as well as other cylinders can exhaust products of combustion via a common exhaust passage 166 and a second bank of cylinders including cylinder 22B as well as other cylinders can exhaust products of combustion via a common exhaust passage 168.

Products of combustion that are exhausted by engine 110 via exhaust passage 166 can be directed through exhaust turbine 124 of turbocharger 120, which in turn can provide mechanical work to compressor 122 via shaft 126 in order to provide compression to intake air as described above. Alternatively, some or all of the exhaust gases flowing through exhaust passage 166 can bypass turbine 124 via turbine bypass passage 123 as controlled by wastegate 128. The position of wastegate 128 may be controlled by actuator 129 as directed by control system 190. As one non-limiting example, control system 190 can adjust the position of actuator 129 via a solenoid valve 121. In this particular example, solenoid valve 121 receives a pressure difference for facilitating the actuation of wastegate 128 via actuator 129 from the difference in air pressures between intake passage 142 arranged upstream of compressor 122 and intake passage 149 arranged downstream of compressor 122. As indicated by FIG. 1, control system 190 communicates with actuator 129 via solenoid valve 121. However, it should be appreciated in other examples other suitable approaches for actuating wastegate 128 may be used.

Similarly, products of combustion that are exhausted by engine 110 via exhaust passage 168 can be directed through exhaust turbine 134 of turbocharger 130, which in turn can provide mechanical work to compressor 132 via shaft 136 in order to provide compression to intake air flowing through the second branch of the engine's intake system. Alternatively, some or all of the exhaust gases flowing through exhaust passage 168 can bypass turbine 134 via turbine bypass passage 133 as controlled by wastegate 138. The position of wastegate 138 may be controlled by actuator 139 as directed by control system 190. The position of wastegate 138 may be controlled by actuator 139 as directed by control system 190. As one non-limiting example, control system 190 can adjust the position of actuator 139 via a solenoid valve 131. In this particular example, solenoid valve 131 receives a pressure difference for facilitating the actuation of wastegate 138 via actuator 139 from the difference in air pressures between intake passage 144 arranged upstream of compressor 132 and intake passage 149 arranged downstream of compressor 132. As indicated by FIG. 1, control system 190 communicates with actuator 139 via solenoid valve 131. However, it should be appreciated that in other examples other suitable approaches for actuating wastegate 138 may be used.

In some examples, exhaust turbines 124 and 134 may be configured as variable geometry turbines, whereby associated actuators 125 and 135 may be used to adjust the position of the turbine impeller blades to vary the level of energy that is obtained from the exhaust gas flow and imparted to their respective compressor. For example, the control system can be configured to independently vary the geometry of the exhaust gas turbines 124 and 134 via their respective actuators 125 and 135.

Products of combustion exhaust by one or more cylinders via exhaust passage 166 can be directed to ambient via exhaust passage 170. Exhaust passage 170 may include an exhaust aftertreatment device such as catalyst 174, and one or more exhaust gas sensors indicated at 184 and 185, for example. Similarly, products of combustion exhaust by one or more cylinders via exhaust passage 168 can be directed to ambient via exhaust passage 172. Exhaust passage 172 may include an exhaust aftertreatment device such as catalyst 176, and one or more exhaust gas sensors indicated at 186 and 187, for example. Exhaust gas sensors 184, 185, 186, and/or 187 can communicate with control system 190.

Engine system 100 can include various other sensors. For example, at least one of intake passages 142 and 144 can include a mass air flow sensor. A mass airflow sensor may include, as one example, a hot wire anemometer or other suitable device for measuring mass flow rate of the intake air. As one particular example, a first intake passage branch 142 includes a mass air flow sensor 180 arranged upstream of compressor 122 while a second intake passage branch 144 does not include a mass air flow sensor. As another example, mass air flow sensor 180 may be alternatively arranged along intake passage 144 upstream of compressor 132 and may be omitted from intake passage 142. As another example, mass air flow sensor 180 may be arranged along intake passage 146 downstream of compressor 122. As yet another example, mass air flow sensor 180 may be arranged along intake passage 148 downstream of compressor 132. However, in some example, the rate of degradation of the mass airflow sensor may be greater when the sensor is arranged downstream of a compressor as compared to when it is arranged upstream of the compressor since oil contaminants can be ejected by the compressor into the airstream. Thus, as described herein, in at least some examples, engine system 100 includes an asymmetric arrangement whereby a mass air flow sensor is arranged in only one branch of the engine's intake system. Regardless of the particular configuration, mass airflow sensor 180 can communicate with control system 190 as shown in FIG. 1.

Control system 190 can include one or more controllers configured to communicate with the various sensors and actuators described herein. As one example, control system 190 can include at least one electronic controller comprising one or more of the following: an input/output interface for sending and receive electronic signals with the various sensors and actuators, a central processing unit, memory such as random accessible memory (RAM), read-only memory (ROM), keep alive memory (KAM), each of which can communicate via a data bus. Control system 190 may include a proportional-integral-derivative (PID) controller in some examples. However, it should be appreciated that other suitable controllers may be used as can be appreciated by one skilled in the art in light of the present disclosure.

Control system 190 can be configured to vary one or more operating parameters of the engine on an individual cylinder basis. For example, the control system can adjust valve timing by utilizing a variable cam timing (VCT) actuator, spark timing by varying the time at which the spark signal is provided to the spark plug, and/or fuel injection timing and amount by varying the pulse width of the fuel injection signal that is provided to the fuel injector by the control system as will also be appreciated in light of the present disclosure. Thus, the spark timing, valve timing, and fuel injection timing can be actuated by the control system as will be described in greater detail with reference to FIGS. 3 and 4.

Thus, FIG. 1 shows a non-limiting example of an engine system including twin turbochargers including an asymmetrically arranged mass airflow sensor. As will be described with reference to FIGS. 2 and 3, the mass airflow through each branch of the intake passage can be determined without requiring a mass airflow sensor to be arranged in each of the branches. In this way, a mass airflow sensor can be omitted from engine system 100, thereby enabling a reduction in cost. Alternatively, where each branch of the intake passage includes a mass airflow sensor, the approaches described herein can be implemented to identify the mass airflow in each of the intake branches where there is a failure or degradation of one of the mass airflow sensors. Further, the approaches described herein can be used to diagnose whether one of two mass airflow sensors has degraded or failed.

Figure 2:
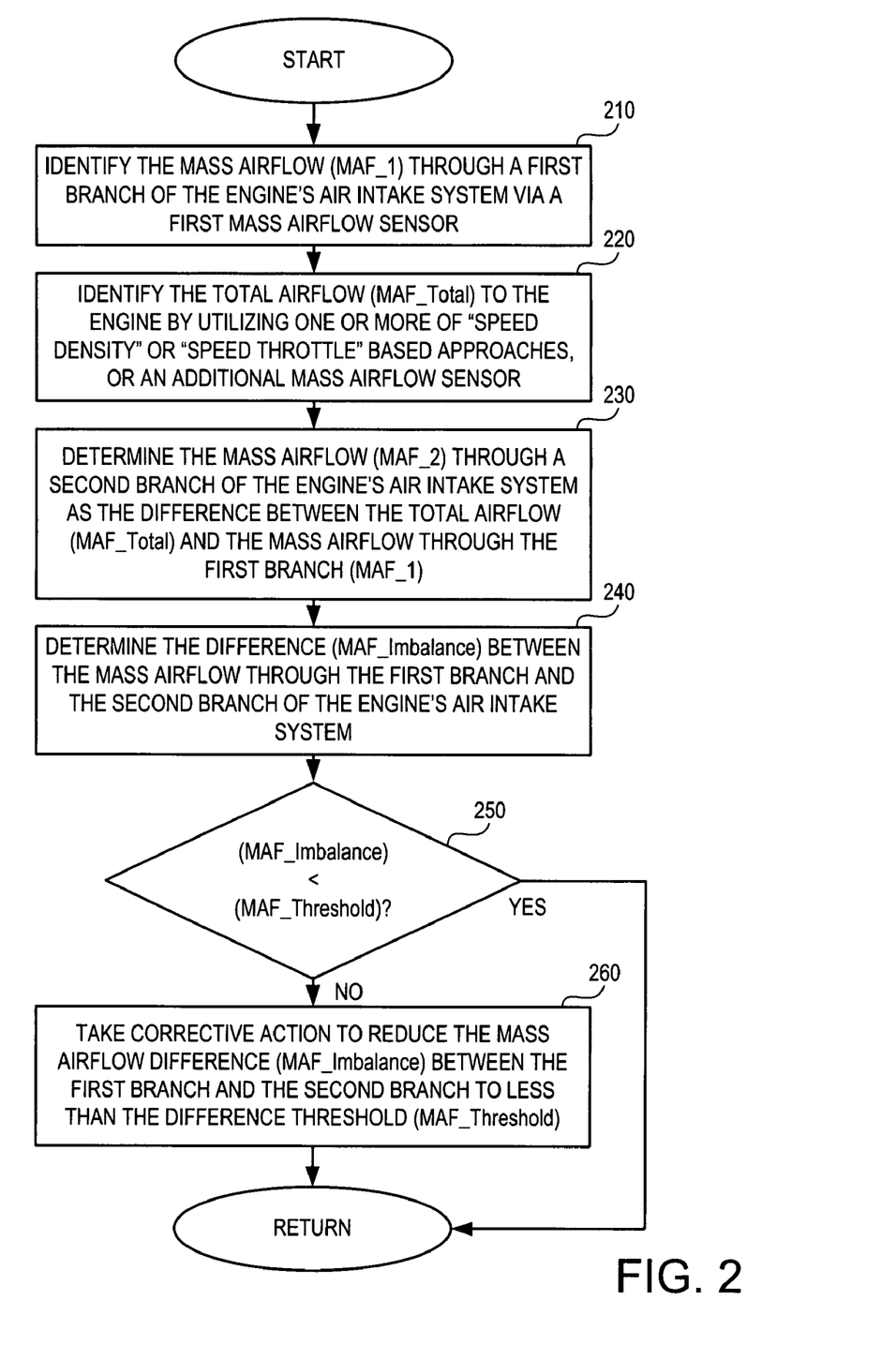
FIG. 2 shows a flow chart depicting an example approach for identifying mass airflow through each turbocharger of the engine system.

FIG. 2 shows a flow chart depicting an example approach for identifying mass airflow through each branch of the air intake system and hence the mass airflow through each turbocharger of the engine system. At 210, the mass airflow (MAF_1) through a first branch of the engine's air intake system may be identified via a mass airflow sensor. As one example, sensor 180 arranged in one of the air intake branches may be used to identify the mass airflow through its respective branch. For example, mass airflow sensor 180 can be used by control system 190 to determine the mass airflow through a first branch of the engine system comprising intake passage 142, compressor 122, and intake passage 146, whereby the mass airflow sensor is arranged along one of intake passages 142 or 146. As another example, mass airflow sensor 180 can be used by control system 190 to determine the mass airflow through the other branch of the engine's intake system comprising intake passage 144, compressor 132, and intake passage 148, whereby the mass airflow sensor is instead arranged along one of intake passage 144 or 148.

At 220, the total or combined mass airflow (MAF_Total) to the engine may be identified by using one or more of a speed-density or speed-throttle based approaches. As one example, the control system can utilize the speed-density based approach to identify the total mass airflow to the engine by identifying the pressure of the intake air within the intake manifold via intake manifold pressure sensor 182, the temperature of the intake air within the intake manifold via intake manifold temperature sensor 183, and the speed of the engine via engine speed sensor 181. As another example, the control system can utilize the speed-throttle based approach to identify the total mass airflow to the engine by identifying the position of throttle 158 via throttle position sensor 157 and the speed of the engine via engine speed sensor 181. As yet another example, the control system can utilize an additional mass airflow sensor arranged within the intake passage or intake manifold downstream of where the airflow through the first and second branches are recombined. In this way, the total mass airflow to the engine may be identified by the control system by utilizing a combination of intake manifold pressure, engine speed, intake manifold temperature, and/or throttle position. As one example, the control system may reference a look-up table or engine map stored in memory to identify the total mass airflow responsive to intake manifold pressure, intake manifold temperature, engine speed, and/or throttle position.

At 230, the mass airflow through the second branch of the engine's intake air system may be determined as the difference between the total mass airflow identified at 220 and the airflow through the first branch of the intake system identified at 210, since the total mass airflow to the engine is based upon the summation of the mass airflows provided by both the first and second branches. As one example, the control system may determine the mass flow through the second branch of the engine's intake air system as MAF_2 based upon the following equation:

$$MAF\_2 = MAF\_Total - MAF\_1$$

At 240, the difference between the mass airflow through the first branch and the mass airflow through the second branch of the engine's air intake system may be determined. As one example, the control system may determine the mass airflow difference as MAF_Imbalance based upon one of the following equation:

$$MAF\_Imbalance = MAF\_1 - MAF\_2 \text{ or}$$
$$MAF\_Imbalance = MAF\_2 - MAF\_1$$

As indicated at 250, if the mass airflow difference (MAF_Imbalance) is less than a prescribed mass airflow difference threshold (MAF_Threshold) then the routine may return to 210 where subsequent monitoring of the mass airflow difference between the different branches of the engine's air intake system may be performed by the control system. Alternatively, if the mass airflow difference (MAF_Imbalance) is not less than the prescribed mass airflow difference threshold (MAF_Threshold) then the routine may proceed to 260. It should be appreciated that the control system can identify not only the magnitude of the imbalance, but also which of MAF_1 and MAF_2 is greater. As one example, the control system can be configured with a setpoint value or group of setpoint values representing (MAF_Threshold) against which the mass airflow difference (MAF_Imbalance) is compared. In some examples, MAF_Threshold may vary with operating conditions of the engine. MAF_Threshold can be assigned by the control system to be a function of the total mass airflow to the engine. For example, MAF_Threshold may be based upon a fractional difference or ratio between MAF_1 and MAF_2. In other examples, MAF_Threshold may be constant across a variety of operating conditions.

At 260, corrective action may be taken to reduce the mass airflow difference (MAF_Imbalance) to less than the difference threshold (MAF_Threshold). For example, the control system can increase the mass airflow through the first branch relative to the mass airflow through the second branch when an amount of decrease in the mass airflow through the first branch is more than half an amount of a corresponding decrease in the combined mass airflow. The mass airflow through the first branch can be increased relative to the mass airflow through the second branch by increasing only the mass airflow through the first branch, decreasing only the mass airflow through the second branch, both increasing the mass airflow through the first branch and decreasing the mass airflow through the second branch, increasing the mass airflow through the first branch to a greater extent than an increase in the mass airflow through the second branch, or reducing the mass airflow through the second branch to a greater extent than a decrease in the mass airflow through the first branch. However, where a constant combined airflow of the first and the second branches is to be maintained, the control system can increase the airflow through the first branch relative to the second branch by increasing the mass airflow through the first branch by an amount that is equal to a reduction in the mass airflow through the second branch.

As another example, the control system can reduce the mass airflow through the first branch relative to the mass airflow through the second branch when an amount of increase in the mass airflow through the first branch is more than half an amount of a corresponding increase in the combined mass airflow. The mass airflow through the first branch can be reduced relative to the mass airflow through the second branch by reducing only the mass airflow through the first branch, increasing only the mass airflow through the second branch, both reducing the mass airflow through the first branch and increasing the mass airflow through the second branch, reducing the mass airflow through the first branch to a greater extent than a reduction in the mass airflow through the second branch, or increasing the mass airflow through the second branch to a greater extent than an increase in the mass airflow through the first branch. However, where a constant combined airflow of the first and the second branches is to be maintained, the control system can reduce the airflow through the first branch relative to the second branch by reducing the mass airflow through the first branch by an amount that is equal to an increase in the mass airflow through the second branch.

Thus, the control system can control the mass airflow through one or both of the branches to respond to imbalances in the mass airflow between the two branches by adjusting one or more actuators described herein. For example, the control system can vary an operating parameter of the turbine (e.g. turbine geometry, wastegate position, etc.) to increase or decrease the speed of the compressor, thereby varying the mass airflow through the compressor's branch. For example, the mass airflow through the first branch can be increased by increasing the speed of the compressor arranged along the first branch and can be reduced by reducing the speed of the compressor. Similarly, the mass airflow through the second branch can be increased by increasing the speed of the compressor arranged along the second branch and can be reduced by reducing the speed of the compressor. Various approaches for reducing (MAF_Imbalance) will be described in greater detail with reference to FIG. 3.

Figure 3:
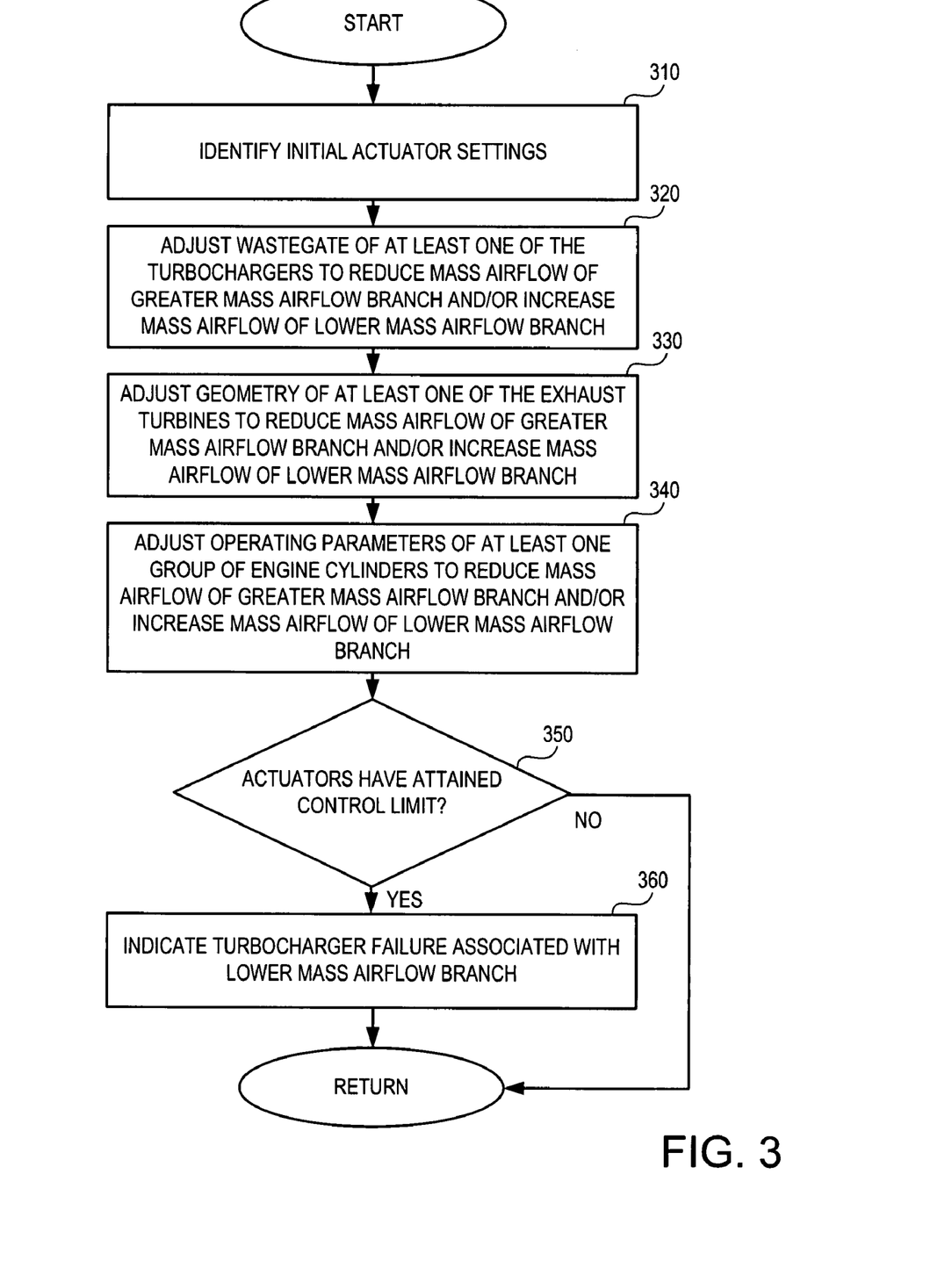
FIG. 3 shows a flow chart depicting an example approach for controlling the engine system to reduce the mass airflow difference identified using the approach of FIG. 2.

FIG. 3 shows a flow chart depicting an example approach for controlling the engine system to reduce the mass airflow difference between different branches of the engine's air intake system. At 310, the initial (e.g. current) actuator settings can be identified. For example, the control system may assess the current operating state of the various actuators associated with the turbocharger wastegates, variable geometry turbines, intake and exhaust valve timing devices, etc.

The control system may then perform one or more of the operations described with reference to 320, 330, and 340 to reduce the imbalance between the different branches of the engine's air intake system. As one or more of the actuators are adjusted as directed by one or more of the operations of 320, 330, and 340, the control system may monitor the actuator settings with regards to their control limits. If one of the actuators has reached its control limit (e.g. a wastegate is fully closed or fully open) then the control system may adjust one or more other actuators that have not yet reached their control limits in order to further reduce mass airflow imbalances between the different air intake branches of the engine.

At 320, at least one wastegate may be adjusted to reduce the mass airflow of the intake branch having the greater mass airflow and/or to increase the mass airflow of the intake branch having the lower mass airflow. For example, the control system may open or increase the opening of the wastegate associated with the turbocharger that is responsible for the higher mass airflow to reduce the level of compression provided by the compressor, thereby reducing the mass airflow associated with that branch. Alternatively or additionally, the control system may close or reduce the opening of the wastegate associated with the turbocharger that is responsible for the lower mass airflow to increase the level of compression provided by the compressor, thereby increasing the mass airflow associated with that branch. Note that if one of the wastegates has reached its control limit and additional adjustment of the mass airflow is desired, the control system can further adjust the other wastegate among other actuators described with reference to operations 320, 330, and 340 if they have not yet reached their control limit.

At 330, the geometry of at least one of the exhaust turbines may be adjusted to reduce the mass airflow of the air intake branch having the greater mass airflow and/or to increase the mass airflow of the air intake branch having the lower mass airflow. For example, the control system may adjust the turbine's impeller geometry to increase the conversion of the energy contained in the exhaust gases to kinetic energy, which may be supplied to the compressor associated with the lower mass airflow branch, thereby increasing the mass airflow provided to the engine by that branch via higher compression. Alternatively or additionally, the control system may adjust the turbine's impeller geometry to reduce the conversion of the energy contained in the exhaust gases to kinetic energy, which may be supplied to the compressor associated with the higher mass airflow branch, thereby reducing the mass airflow associated with that branch via lower compression. Note that if one of the variable geometry turbine actuators has reached its control limit and additional adjustment of the mass airflow is desired, the control system can further adjust the other variable geometry turbine among other actuators described with reference to operations 320, 330, and 340 if they have not yet reached their control limit.

At 340, one or more operating parameters of at least one cylinder group (e.g. including one or more cylinders of the engine) may be adjusted to reduce the mass airflow of the air intake branch having the greater mass airflow and/or to increase the mass airflow of the air intake branch having the lower mass airflow. For example, the control system may vary the valve timing, spark timing, fuel amount, or fuel injection timing associated with a group of cylinders to increase or decrease the amount of exhaust gas energy that is provided to their respective exhaust gas turbines. For example, the control system can increase the exhaust gas energy provided to a turbine associated with a lower mass airflow branch in order to increase the compression provided by the compressor, which in turn can increase the mass airflow provided by the particular branch of the air intake system. Alternatively or additionally, the control system can reduce the exhaust gas energy provided to a turbine associated with the greater mass airflow branch in order to reduce the compression provided by the compressor, which in turn can reduce the mass airflow provided by the particular branch of the air intake system. Note that if one of actuators including the intake and exhaust valve actuators, sparking device, or fuel injector has reached its control limit and additional adjustment of the mass airflow is desired, the control system can further adjust the operating parameters associated with other cylinders among other actuators described with reference to operations 320, 330, and 340 if they have not yet reached their control limit.

At 350, it may be judged whether the actuators that are operable to reduce the mass airflow imbalance have attained their respective control limits. If the answer is no, the routine may return to provide additional reduction of mass airflow imbalance via one or more of 320, 330, or 340 as directed by the control system. Alternatively, if the answer at 350 is yes, the control system may indicate that the turbocharger associated with the lower mass airflow branch has failed or has degraded. For example, the control system can provide an indication of turbocharger or wastegate degradation or failure to the vehicle operator or repair personnel and/or may disable operation of the engine if appropriate in order to reduce damage that may otherwise occur.

Figure 4:
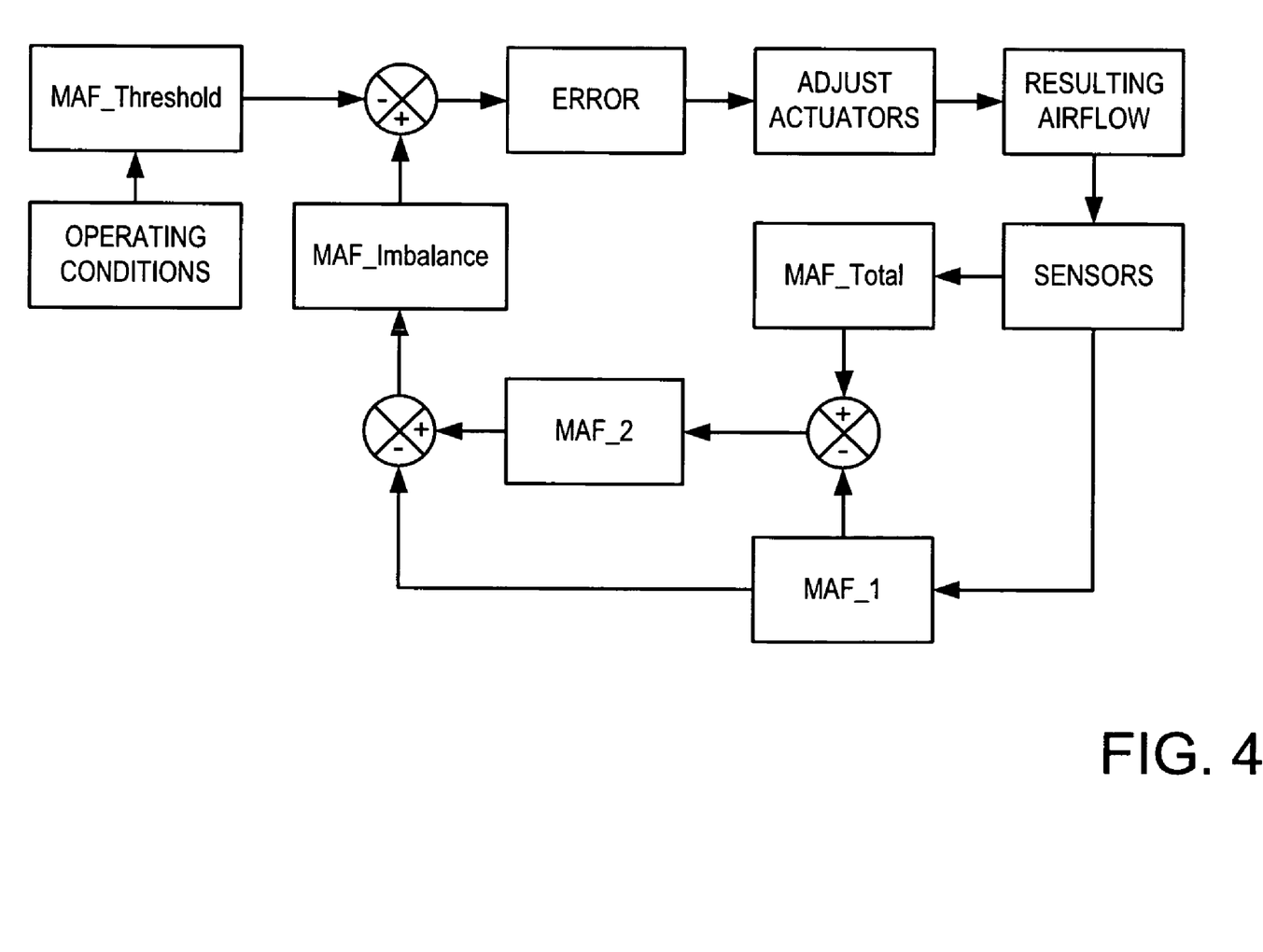
FIG. 4 shows a control diagram schematically depicting the control strategy of FIGS. 2 and 3.

FIG. 4 shows a control diagram schematically depicting the control strategy of FIGS. 2 and 3. For example, as shown in FIG. 4, outputs from a combination of sensors such as the mass airflow sensor, engine speed sensor, intake manifold pressure sensor, intake manifold temperature sensor, throttle position sensor, etc. may be used by the control system to identify the total mass airflow to the engine (MAF_Total) and the mass airflow of a single branch of the engine's intake air system (MAF_1) as described with reference to FIGS. 2-4. The difference between MAF_Total and MAF_1 can be determined in order to estimate the mass airflow (MAF_2) through the second branch of the engine's air intake system without necessarily requiring a mass airflow signal to be provided from a mass airflow sensor disposed within the second branch.

The difference between MAF_1 and MAF_2 may be used to determine the extent of the mass airflow difference (MAF_Imbalance) between the different branches of the engine's air intake system. A threshold mass airflow difference (MAF_Threshold) may be selected based on operating conditions, may be based on a fixed value, or may be based on a ratio of MAF_1 and MAF_2. The difference between MAF_Imbalance and MAF_Threshold may be identified as the error to which the control system responds by adjusting one or more actuators of the engine system as described with reference to FIG. 3. The resulting mass airflow from the adjustments to the actuators can be identified by one or more of the above described sensors as the process may be repeated. In this way, imbalances between the airflow provided to the engine via two separate branches each including a turbocharger may be identified and a suitable control strategy may be implemented to reduce the imbalance.

Thus, one or more of the various approaches described herein may be used to reduce mass airflow imbalance between different branches of the engine's intake system during conditions where only one of the branches includes a mass airflow sensor or where a mass airflow sensor associated with one of the branches has failed or becomes degraded. In this way, by reducing the mass airflow imbalance responsive to a detected change in one of the combined mass airflow (MAF_Total) and the mass airflow through the first branch (MAF_1), noise and vibration harshness (NVH) of the engine may be reduced and/or fuel efficiency may be increased.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system. It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating an engine system including an engine having a first air intake passage branch including a first compression device and a second air intake passage branch including a second compression device, wherein each of the first branch and the second branch are fluidly coupled to at least a combustion chamber of the engine via a common intake passage, a first sensor arranged along the first air intake passage branch and at least a second sensor arranged along the common intake passage, wherein the first sensor is a mass airflow sensor and wherein the branch does not include a mass airflow sensor, the method comprising:
increasing mass airflow through the first air intake passage branch relative to mass airflow through the second air intake passage branch when an amount of decrease in the mass airflow through the first air intake passage branch is more than half an amount of a corresponding decrease in a combined first air intake passage branch mass airflow and second air intake passage branch mass airflow; and
indicating degradation of the first compression device or of the second compression device.

2. The method of claim 1 further comprising, reducing the mass airflow through the first branch relative to the mass airflow through the second branch when an amount of increase in the mass airflow through the first branch is more than half an amount of a corresponding increase in the combined first air intake passage branch mass airflow and second air intake passage branch mass airflow.

3. The method of claim 1, wherein the mass airflow through the first air intake passage branch is identified based on an output of the first sensor and wherein the combined first air intake passage mass airflow and second air intake passage branch mass airflow is identified based on an output of at least the second sensor.

4. The method of claim 3, wherein the second sensor is configured to sense pressure within the common intake passage.

5. The method of claim 4, wherein the combined mass airflow is further identified based on a rotational speed of the engine as sensed by a third sensor.

6. The method of claim 1, wherein the mass airflow through the first air intake passage branch is adjusted by varying a speed of the first compression device and wherein the mass airflow through the second air intake passage branch is adjusted by varying a speed of the second compression device.

7. The method of claim 6, wherein the first compression device is coupled to a first exhaust turbine arranged in a first exhaust passage of the engine and the second compression device is coupled to a second exhaust turbine arranged in a second exhaust passage of the engine; and wherein the speed of the first compression device is varied by adjusting a geometry of the first turbine and the speed of the second compression device is varied by adjusting a geometry of the second turbine.

8. The method of claim 6, wherein the first compression device is coupled to a first exhaust turbine arranged in a first exhaust passage of the engine and the second compression device is coupled to a second exhaust turbine arranged in a second exhaust passage of the engine; and wherein the speed of the first compression device is varied by adjusting a flow of exhaust gases through the first turbine and the speed of the second compression device is varied by adjusting a flow of exhaust gases through the second turbine.

9. The method of claim 8, wherein the flow of exhaust gases through the first turbine is adjusted by varying a position of a first wastegate and wherein the flow of exhaust gases through the second turbine is adjusted by varying a position of a second wastegate.

10. The method of claim 1, wherein the mass airflow through the first air intake passage branch is increased relative to the mass airflow through the second air intake passage branch by increasing a speed of the first compression device relative to a speed of the second compression device.

11. A method of operating an engine system including an air intake system having two branches, wherein each branch includes an air compression device, and wherein the engine system further includes a single mass airflow sensor asymmetrically arranged and disposed in only one of the two branches of the air intake system, the method comprising:
operating a first air compression device to provide intake air to the engine via a first branch of the two branches;
operating a second air compression device to provide intake air to the engine via a second branch of the two branches;
varying a relative amount of the intake air provided to the engine via the first and second branches based on an output of the single mass airflow sensor; and
indicating that operation of the first or second air compression device has degraded when a control limit of the first or second compression device is attained.

12. The method of claim 11, wherein said relative amount of intake air provided to the engine via the first and second branches is varied by adjusting a speed of at least one of the first and second compression devices.

13. The method of claim 11, wherein the first compression device is coupled to a first exhaust gas turbine arranged in a first exhaust stream of the engine and the second compression device is coupled to a second exhaust gas turbine arranged in a second exhaust stream of the engine; and wherein the relative amount of intake air is varied by adjusting an operating parameter of at least one of the first turbine and the second turbine.

14. The method of claim 13, wherein the operating parameter includes an amount of exhaust gas bypassing the first turbine or second turbine.

15. The method of claim 13, wherein the operating parameter includes a geometry of at least one of the first turbine and the second turbine.

16. The method of claim 11, wherein said varying the relative amount of the intake air provided to the engine via the first and second branches is further based on an output of at least one of an engine speed sensor coupled to an output shaft of the engine and a pressure sensor coupled to a common intake manifold of the first and second branches, and a position of a throttle of the engine.

17. An engine system, comprising:
an air intake system including a first branch and a second branch, wherein only the first branch includes a mass airflow sensor and the second branch does not include a mass airflow sensor;
a first compression device arranged along the first branch;
a second compression device arranged along the second branch;
an air intake manifold in fluid communication with each of the first and second branches;
a second sensor arranged in the intake manifold;
an internal combustion engine including at least a first combustion cylinder and a second combustion cylinder in fluid communication with the air intake manifold; and
a control system that indicates degradation of the first or second compression device.

18. The system of claim 17, wherein the control system is configured to vary a speed of the first compression device relative to a speed of the second compression device and is responsive to an output of at least the mass airflow sensor and the second sensor; wherein each of the mass airflow sensor and second sensor is communicatively coupled with the control system.

19. The system of claim 17, further comprising a first exhaust passage in fluid communication with the first combustion cylinder; a second exhaust passage in fluid communication with the second combustion cylinder; a first turbine arranged along the first exhaust passage and coupled to the first compression device; a second turbine arranged along the second exhaust passage and coupled to the second compression device; and wherein the second sensor includes at least one of a pressure sensor and a temperature sensor.

20. The system of claim 19, wherein the control system is configured to vary a speed of the first compression device relative to a speed of the second compression device by varying an operating parameter of at least one of the first turbine and the second turbine.

* * * * *